(12) United States Patent
Soni et al.

(10) Patent No.: US 10,489,823 B2
(45) Date of Patent: Nov. 26, 2019

(54) SERVICE SYSTEM TO DETERMINE JOURNEYS BASED ON COMPANION RELATIONSHIP

(71) Applicant: Adobe Inc., San Jose, CA (US)

(72) Inventors: Sachin Soni, New Delhi (IN); Stephane D. Moreau, L'Hay les Roses (FR); Ashish Duggal, Delhi (IN)

(73) Assignee: Adobe Inc., San Jose, CA (US)

( * ) Notice: Subject to any disclaimer, the term of this patent is extended or adjusted under 35 U.S.C. 154(b) by 246 days.

(21) Appl. No.: 15/476,743

(22) Filed: Mar. 31, 2017

(65) Prior Publication Data
US 2018/0285930 A1    Oct. 4, 2018

(51) Int. Cl.
| | |
|---|---|
| *G06Q 30/02* | (2012.01) |
| *H04W 4/021* | (2018.01) |
| *H04L 29/08* | (2006.01) |
| *G06Q 50/14* | (2012.01) |

(52) U.S. Cl.
CPC ..... *G06Q 30/0261* (2013.01); *G06Q 30/0267* (2013.01); *H04W 4/021* (2013.01); *G06Q 50/14* (2013.01); *H04L 67/18* (2013.01)

(58) Field of Classification Search
CPC .......... G06Q 30/0261; G06Q 30/0267; G06Q 50/14; H04W 4/021; H04L 67/18
See application file for complete search history.

(56) References Cited

U.S. PATENT DOCUMENTS

| | | | |
|---|---|---|---|
| 2008/0076418 A1* | 3/2008 | Beyer, Jr. ........... | H04M 1/72572 455/435.1 |
| 2016/0050315 A1* | 2/2016 | Malhotra .............. | H04M 3/436 455/414.1 |
| 2018/0352378 A1* | 12/2018 | Sahadi .................. | H04W 4/024 |

\* cited by examiner

*Primary Examiner* — Michael A Keller
(74) *Attorney, Agent, or Firm* — SBMC

(57) ABSTRACT

In implementations of a service system to determine journeys based on companion relationship, a server computing device maintains event information about events associated with previous visitors within a designated geographic region, and a devices graph that correlates user identities with devices. A journey determination application can receive an indication that a mobile device has entered the designated geographic region, and correlate the mobile device to an identity of a user. A companion device that is associated with the mobile device can be determined based on companionship information identifying the association of the devices, and the companion device correlates to a companion. The journey determination application determines a journey based on a relationship of the companion to the user of the mobile device and based on the events associated with the previous visitors within the designated geographic region, the journey being designed to elicit a location-based visitor response from the user.

20 Claims, 5 Drawing Sheets

SERVICE SYSTEM TO DETERMINE JOURNEYS BASED ON COMPANION RELATIONSHIP

BACKGROUND

Many people carry and utilize mobile devices, such as mobile phones and tablet devices, for work, leisure, and many other activities. For the most part, people who have a mobile device take it everywhere, whether for business, at home, to the gym, on vacation, and wherever else a person's travels take them. Knowing how mobile phones have become an extension of users' everyday activities, digital marketing systems, such as implemented by advertisers and marketers, seek to capitalize on this by finding ways to communicate information and advertisements directly to users via their mobile devices. A timely directed advertisement or communication from a digital marketing system, for instance, can increase the likelihood of success that a recipient will engage in the offer found in the advertisement or communication, such as to purchase an item or hire an advertised service, which is generally known as a "conversion". However, conventional digital marketing systems are still challenged to effectively determine a person or group of people and associated mobile devices who may be considered as intended consumers of the products and services that are offered by directed advertisements and communications. Further, many such advertisements are location-specific, and consequently, it is difficult for conventional digital marketing systems to timely determine potential consumers, as well as gather and relay information to a marketing system of a marketer so that the marketing system can then communicate a directed advertisement before the opportunity to engage a targeted consumer is missed.

SUMMARY

This Summary introduces features and concepts of a service system to determine journeys based on companion relationship, which is further described below in the Detailed Description and shown in the Figures. This Summary should not be considered to describe essential features of the claimed subject matter, nor used to determine or limit the scope of the claimed subject matter.

Aspects of a service system to determine journeys based on companion relationship are described. In implementations, a server computing device, such as implemented at a cloud-based service system, maintains event information about events associated with previous visitors within a designated geographic region. A marketer may designate a geographic region as an area in which the marketer would like to focus communications to visitors, such as at a resort, a hotel, or other travel destination where visitors participate in various activities and are inclined to shop, dine, and engage in other vacation-type activities. The events that are associated with the previous visitors within a designated geographic region can include event information, such as the types of activities and/or transactions for goods or services. The events that are associated with the previous visitors can also include location information within the designated geographic region, such as an initial location of a mobile device that corresponds to a previous visitor and one or more subsequent defined locations of the mobile device within the designated geographic region as the user visits the various locations carrying the mobile device.

The server computing device at the cloud-based service system also maintains a devices graph that correlates respective identities of users with devices, such as a mobile device, tablet device, communication device, and/or mobile phone that a user may carry while traveling. The user identities of users who are correlated with their devices by device identifier are the previous visitors, as well as the current and/or future visitors, to the designated geographic region. The user identities can be correlated with one or more of the devices, such as a user may be associated with his or her mobile phone. Additionally, the devices graph can include companionship information, which identifies one or more additional mobile devices that are associated with the identity of a user of a mobile device, or are associated with the mobile device itself. For example, a visitor to a designated geographic region may travel with a family member who also has a mobile device, and the mobile devices are associated in the devices graph, as well as the visitor and family companion may be associated in the devices graph. Similarly, a visitor to a designated geographic region may travel with a business associate who also has a mobile device, and the mobile devices are associated in the devices graph, as well as the visitor and business companion may be associated in the devices graph.

In aspects of a service system to determine journeys based on companion relationship, the cloud-based service system can determine a journey based on the companionship information that corresponds to the mobile device of a user. For example, the companionship information may identify additional mobile devices that are associated with the mobile device of the visitor to a particular resort or hotel. Any of the additional mobile devices that are associated with the mobile device and/or the user may also be located within the designated geographic region, indicating that the visitor is traveling with at least one companion. The journey that is then determined by the cloud-based service system for a marketing system about a visitor can take into account that the visitor is traveling with a companion, and the journey may be designed to elicit a different location-based visitor response than if the visitor were traveling alone. For example, given the starting location of the mobile device of the visitor within the designated geographic region, the journey may be determined by the cloud-based service system to emphasize one area of the resort or hotel over another, such as an area that is likely more accommodating for two people traveling together, for two people who are family members traveling together, or alternatively, for two people who are business associates traveling together.

A journey determination application is implemented by the server computing device at the cloud-based service system. The journey determination application is implemented to receive an indication that a mobile device has entered a designated geographic region, as well as a starting location of the mobile device within the designated geographic region. The journey determination application can determine the correlation of the mobile device to an identity of a user based on the devices graph. The journey determination application can also determine a companion device that is associated with the mobile device based on companionship information identifying the association of the companion device to the mobile device, where the companion device is correlated to a companion of the user. The companionship information may identify a relationship of the companion to the user of the mobile device, such as a family member or business associate who is traveling with the user. The journey determination application can then determine a journey that is designed to elicit a location-based visitor response from the user of the mobile device and/or from the companion of the device user (e.g., the user is the visitor to the designated geographic region).

The journey determination application that is implemented by the server computing device at the cloud-based service system can determine the journey based on the starting location of the mobile device, the relationship of the companion to the user of the mobile device, and based on the events data associated with the previous visitors within the designated geographic region. For example, previous visitors to a particular resort or hotel may have been likely to visit some areas of the resort or hotel more than other less-traveled areas of the resort or hotel, and engage in various types of activities and/or transactions for goods or services. Accordingly, the journey determination application can determine a journey for a marketing system based on the starting location of the mobile device of the current visitor in the designated geographic region, and based on the relationship of a companion who travels with the current visitor, such as a family member or business associate. The journey can be determined as a family journey if the relationship of the companion to the user is a family member of the user, or the journey can be determined as a business journey if the relationship of the companion to the user is a business associate. The journey may also be tailored to whether the marketer of the marketing system wants to continue to emphasize the frequently traveled areas of the designated geographic region, or emphasize the other, less-traveled areas.

The cloud-based service system can then communicate a journey as a suggested, relevant journey for the user of the mobile device to the marketing system of the marketer that is associated with the designated geographic region. The marketing system may then communicate the journey to the mobile device of the user (e.g., the visitor to the resort or hotel), and the journey is designed to elicit a location-based visitor response from the user of the mobile device, such as to prompt the user and/or the companion to travel from the current starting location to another area of the designated geographic region. In this implementation, the journey is routed via the marketing system that may then communicate the journey to the mobile device of the user. In an alternate implementation, the journey is communicated to the mobile device of the user from the server computing device that determines the journey at the cloud-based service system.

BRIEF DESCRIPTION OF THE DRAWINGS

Implementations of a service system to determine journeys based on companion relationship are described with reference to the following Figures. The same numbers may be used throughout to reference like features and components that are shown in the Figures.

DETAILED DESCRIPTION

Figure 1:
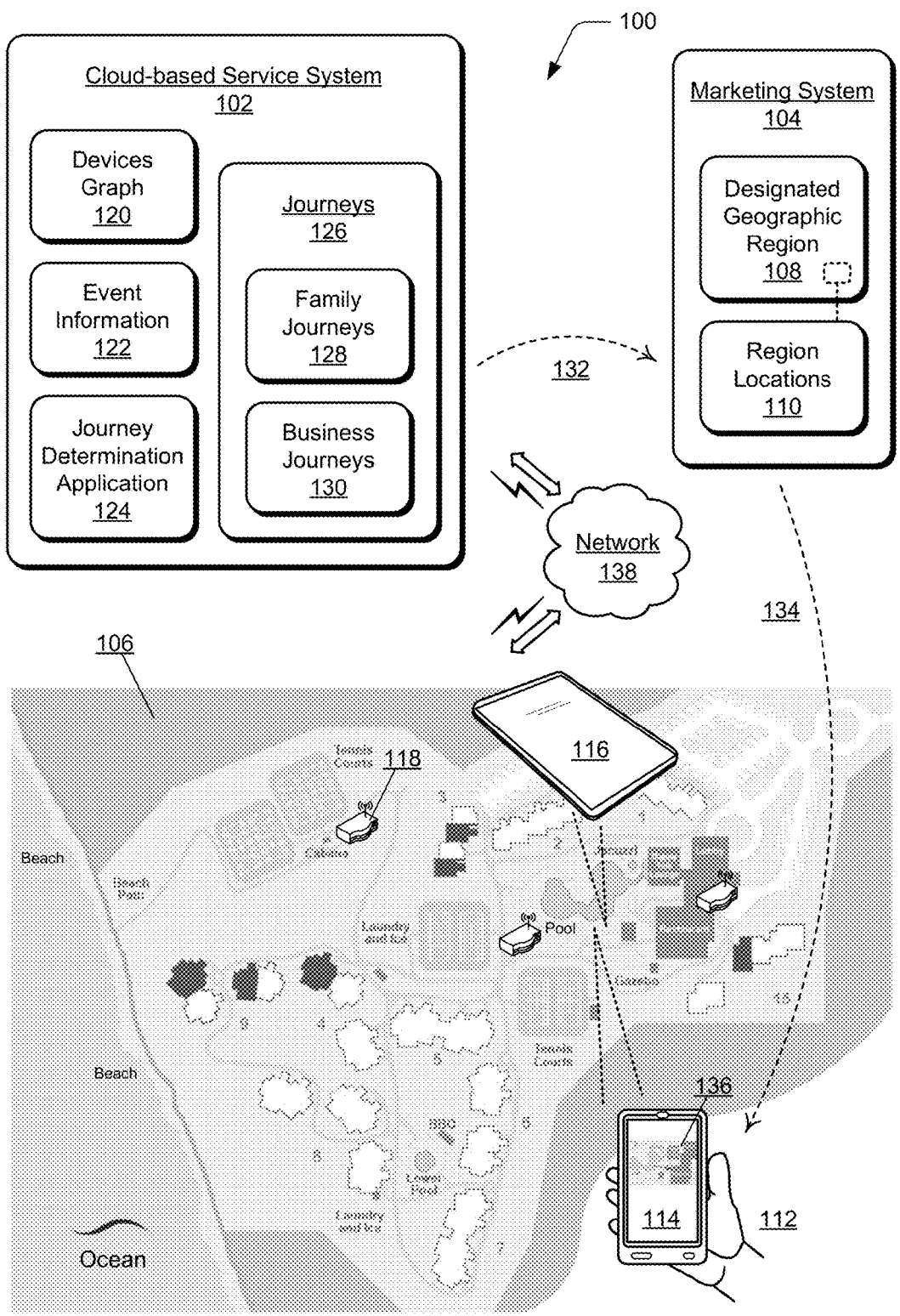
FIG. 1 illustrates an example system in which aspects of a service system to determine journeys based on companion relationship can be implemented.

Implementations of a service system to determine journeys based on companion relationship are described. Many digital marketing systems are associated with travel destinations, such as resorts, hotels, cruise ships, and other travel destinations. The digital marketing systems are associated with marketers that seek to not only attract visitors, but also entice visitors to engage in dining, shopping, and other vacation-type activities that typically involve transactions for goods and services while visiting a travel destination. A marketer can designate a geographic region as an area in which the marketer would like to focus communications as journeys that are communicated to visitors, and the journeys enable a marketing system of the marketer to automate coordinated event-based interactions with the visitors. The marketing system interacts with a cloud-based service system that determines suggested journeys for the marketing system. The cloud-based service system determines the journeys based in part on the association of a companion, or companions, who travel with a visitor, and given the relationship of the people traveling together, a journey can be determined differently for family companions or for business traveling companions. The cloud-based service system is implemented to determine the association of a mobile device with a particular user, as well as determine the association of a companion device of a family member or business associate who is traveling with the user of the mobile device. A journey can then be determined by the cloud-based service system based on the association of the devices as related to the traveling companions.

The journeys that are determined by the cloud-based service system enable the marketing system of a marketer, such as an owner or manager of a hotel or resort property, to interact with their visitors and traveling companions while they are on property, and the journeys can be communicated to the visitors' mobile devices as relevant, real-time notifications. The journeys also provide information that is designed to increase revenue, while at the same time, improve visitor satisfaction and overall experience while visiting and staying on the property. The cloud-based service system can also determine the journeys based on past and present visitor experiences and location, and as noted above, take into account whether a visitor is traveling alone, or with companions, such as family members and/or business associates. Generally, a visitor who travels with one or more family members may engage in different activities than a visitor who travels with one or more business associates. Accordingly, the cloud-based service system may determine a journey as a family journey for two or more people who are family members traveling together, or alternatively, determine the journey as a business journey for two or more people who are business associates traveling together.

The cloud-based service system can implement a journey determination application that determines the journeys for a marketing system of the marketer, and the journeys can be communicated to the marketing system and then to visitors' and companions' mobile devices from the marketing system as push notifications or other electronic communications. A journey may include a coupon or any other type of discount or reward-based consumer enticement. A journey can also be displayed on a mobile device as an image or other graphic that is intended to prompt or entice a visitor to visit an area of the hotel or resort property, and/or engage in a transaction for goods or services. Alternatively or in addition to being displayable, a journey may be designed as any type of audio, video, image, or other type of communication to a user of a mobile device.

As further described and used herein, a "designated geographic region" is representative of an area in which a marketer or advertiser would like to focus journeys as communications to visitors and traveling companions, such as at a resort, a hotel, or other travel destination where visitors participate in various activities and are inclined to shop, dine, and engage in other vacation-type activities. A "marketing system" of the marketer is a digital marketing system associated with a designated geographic region. The marketing system can receive identifiers of mobile devices from locations within the designated geographic region, and request a journey from the cloud-based service system. The marketing system can also communicate a new journey or a previously determined journey to the mobile device of a user who is a visitor or traveling companion in the designated geographic region.

As used herein, a "journey" can be determined by the cloud-based service system for delivery as an electronic communication to the marketing system, and then from the marketing system to the mobile device of a visitor and/or traveling companion in the designated geographic region. A journey is designed to elicit a location-based visitor response from the user of the mobile device and/or from a companion of the user, such as to prompt the visitor and/or companion to travel from a current location to another area of the designated geographic region. As noted above, a journey can be displayed on a mobile device as an image or other graphic that is intended to prompt or entice a visitor and/or traveling companion to visit an area of the designated geographic region, and/or engage in a transaction for goods or services.

As further described and used herein, a "journey determination application" is implemented by the cloud-based service system and determines the journeys for the marketing system of the marketer. In implementations, the marketing system of the marketer can subscribe to the cloud-based service system, such as to request the journeys, and for marketing campaigns and on-line consumer analytics. The journey determination application can determine the correlation of a mobile device to an identity of a user. The journey determination application can also determine a "companion device", which is a device that is associated with the mobile device and the companion device is correlated to a traveling companion of the user. For example, a visitor to a designated geographic region may travel with a family member who also has a mobile device. Similarly, a visitor to a designated geographic region may travel with a business associate who also has a mobile device. The journey determination application can then determine a journey that is designed to elicit a location-based visitor response from the user of the mobile device based on whether family members are traveling together, or alternatively, based on whether business associates are traveling together.

While features and concepts of a service system to determine journeys based on companion relationship can be implemented in any number of different devices, systems, networks, environments, and/or configurations, implementations of a service system to determine journeys based on companion relationship are described in the context of the following example devices, systems, and methods.

FIG. 1 illustrates an example system 100 in which techniques of a service system to determine journeys based on companion relationship can be implemented. The example system 100 includes a cloud-based service system 102, which is representative of any number of cloud-based access sites that provide a service and/or from which data and information is available, such as via the Internet, for on-line and/or network-based access. The system 100 also includes an example of a marketing system 104 that may access and subscribe to the cloud-based service system 102, such as for marketing campaigns and on-line consumer analytics. As noted above, the marketing system 104 may be associated with a travel destination, such as a resort, hotel, cruise ship, or other travel destination. The marketer of the marketing system 104 may seek to not only attract visitors, but also entice the visitors to engage in dining, shopping, and other vacation-type activities that typically involve transactions for goods and services while visiting the travel destination.

The marketer of the marketing system 104 can designate a geographic region, which in this example system 100, is illustrated as a resort property 106 that is identified as a designated geographic region 108 at the marketing system 104. The designated geographic region 108 can also include region locations 110, such as a pool area, a restaurant, lounges, a spa, a gym, and other vacation-type areas and services in the designated geographic region 108 that may be of interest to visitors who book accommodations on the property for vacation and/or business purposes.

Generally today, most people carry a mobile device, such as a tablet device, a communication device, and/or a mobile phone. For example, a visitor (generally shown at 112) may be located in or nearby the resort pool area and the visitor has his or her mobile device 114. Additionally, a visitor may be traveling with one or more companions, such as a spouse and/or other family members, who also carry a mobile device, indicated as a companion device 116 (e.g., an additional mobile device) that is also located in or nearby the resort pool area with a family companion of the visitor. Companions may also be business colleagues having mobile devices that are associated with each other, such as if a group of mobile devices are often together in the same areas of a designated geographic region 108.

In the example system 100, the marketing system 104 can subscribe to the cloud-based service system 102, requesting that a journey be determined or authored for the marketing system about the visitor 112 and/or the companion who are currently located within the designated geographic region 108 of the resort property 106. The region locations 110 within the designated geographic region 108, as well as the boundaries of the region can be established by the marketer of the marketing system 104. For example, the region locations 110 may include any number of areas within the designated geographic region 108, such as the pool area, the restaurant, the tennis courts, the gym, and the beach area, to name a few. Any one or more of the various region locations 110 in the designated geographic region 108 (e.g., the resort property 106) can be equipped with networked, IoT (Internet of things) connected devices 118 that connect devices, systems, and services within the resort property 106. Generally, the connected devices 118 can be setup to communicate over a Wi-Fi based local area network (LAN) for the resort property.

The connected devices 118 can be utilized to ping or otherwise communicate with the mobile devices of visitors to the resort property 106, as well as communicate locations of the mobile devices within the designated geographic region 108 to the marketing system 104 and/or to the cloud-based service system 102 as the mobile devices move about the resort property. The connected devices 118 can be implemented as beacons in each of the region locations 110 of the designated geographic region 108 in the resort property 106, such as in the restaurant, the spa, the gym, the pool area, a souvenir shop, and the like. The proximity of the mobile device 114 and/or the companion device 116 to a connected device 118 will convey where in the resort property 106 a visitor is located, and the marketing system 104 can then have a journey determined that is tailored for a particular visitor and traveling companions at a current location.

The marketing system 104 can provide an identification of the mobile device 114 to the cloud-based service system 102, as well as the starting location of the mobile device at the pool area in the designated geographic region 108. The marketing system 104 can request that the cloud-based service system 102 determine a journey that is designed to elicit a location-based visitor response from the user of the mobile device 114, such as to prompt a visitor to engage in an event or activity in the designated geographic region. For example, the marketer of the marketing system 104 may want to increase restaurant sales overall and/or during particular slower times during the day, in which case the marketer wants to prompt or entice visitors who are lounging in the pool area to order drinks and snacks from the nearby restaurant.

The cloud-based service system 102 maintains a devices graph 120 that correlates identities of users with their respective devices, such as an identity of the visitor 112 is correlated with the mobile device 114 that the visitor carries about in the designated geographic region 108. Similarly, an identity of a companion of the visitor can be correlated with the companion device 116 that the companion carries about in the designated geographic region 108. The devices graph 120 can include the companionship information, which identifies one or more additional mobile devices that are associated with the mobile device of a user. For example, the visitor 112 to the designated geographic region 108 may travel with a family member who also has a mobile device, and the mobile devices are associated in the devices graph 120, as well as the visitor and family companion may be associated in the devices graph. Similarly, the visitor 112 to the designated geographic region 108 may travel with a business associate who also has a mobile device, and the mobile devices are associated in the devices graph 120, as well as the visitor and business companion may be associated in the devices graph.

The cloud-based service system also maintains event information 122 about events that are associated with previous visitors within the designated geographic region 108. The events that are associated with the previous visitors within the designated geographic region 108 can include event information, such as the types of activities and/or transactions for goods or services. Visitors at a resort, a hotel, or other travel destination typically participate in various activities and are inclined to shop, dine, and engage in other vacation-type activities that can be summarized as the event information 122. The events that are associated with the previous visitors as the event information 122 can also include location information within the designated geographic region 108, such as an initial location of a mobile device that corresponds to a previous visitor and one or more subsequent defined locations of the mobile device within the designated geographic region as the previous visitor moved about the various locations carrying the mobile device.

In the example system 100, the cloud-based service system 102 implements a journey determination application 124, such as a software application or module as executable software instructions (e.g., computer-executable instructions) that are executable with a processing system of the server computing device to implement aspects of a service system to determine journeys based on companion relationship as described herein. The journey determination application 124 can receive an indication from the marketing system 104, or from the mobile device 114, that the mobile device has entered the designated geographic region 108, as well as the starting location of the mobile device within the designated geographic region. As noted above, the marketing system 104 can communicate an identification of the mobile device 114 to the cloud-based service system 102, as well as the starting location of the mobile device at the pool area in the designated geographic region 108.

The journey determination application 124 is implemented to determine the correlation of the mobile device 114 to an identity of a user (e.g., the visitor 112) based on the devices graph 120. The journey determination application 124 can also determine that the companion device 116 is associated with the mobile device 114 based on companionship information identifying the association of the companion device 116 to the mobile device 114, where the companion device is correlated to a companion of the visitor 112. The companionship information may identify a relationship of the companion to the visitor with the mobile device 114, such as a family member or business associate who is traveling with the visitor. The journey determination application can then determine a journey 126 (also referred to herein as to author, or generate a journey) that is designed to elicit a location-based visitor response from the user of the mobile device and/or from the companion of the user (e.g., the user is the visitor to the designated geographic region).

The journey 126 can be determined based on the starting location of the mobile device 114, the relationship of the companion to the user of the mobile device, and based on the events associated with the previous visitors within the designated geographic region 108. A journey 126 may also be stored or saved as a learned journey that was previously determined and utilized for previous visitors at the same or similar location. For example, previous visitors to the resort property 106 may have been likely to visit the lounge and/or the restaurant if the starting location is the pool area in the designated geographic region 108. Similarly, previous visitors that utilized the gym may have been likely to stop for a refreshment at the juice bar after a workout in the gym. The journey determination application 124 can utilize a learned journey or determine the journey 126 for the current visitor 112 based on the starting location of the mobile device 114 and based on the relationship of the companion to the visitor with the mobile device. The journey determination application 124 can also determine the journey 126 based on aspects of the resort property 106 that the marketer of the marketing system 104 may want to emphasize, such as the restaurant for visitors who are located in the resort pool area.

As noted above, a journey 126 can be determined by the journey determination application 124 based on companionship information that corresponds to the mobile device 114 of the visitor 112. For example, the companionship information of the devices graph 120 identifies additional mobile devices, such as the companion device 116 that is associated with the mobile device 114 of the visitor 112 to the particular resort property 106. Any of the companion devices that are associated with a mobile device may also be located within the designated geographic region 108, indicating that the visitor 112 is traveling with at least one companion. The journey 126 that is then determined for the marketing system 104 about the visitor 112 can take into account whether the visitor is traveling with a companion, and the journey 126 may be designed to elicit a different location-based visitor response than if the visitor were traveling alone.

For example, given the starting location of the mobile device 114 of the visitor 112 within the designated geographic region 108, the journey 126 may emphasize one area of the resort property over another, such as the tennis courts that are more likely to be accommodating for two people traveling together. The journey may be determined (or based on a learned journey) as a family journey 128 for two or more people who are family members traveling together, or alternatively, the journey may be determined as a business journey 130 for two or more people who are business associates traveling together. Further, the event information 122 may indicate that a visitor traveling alone on a business trip is more likely to visit the resort spa, whereas a visitor who is traveling with family members may be more likely to visit the souvenir shop.

A journey 126 that has been determined (e.g., determined or generated at the cloud-based service system 102) can then be communicated at 132 as a suggested, relevant journey for the visitor 112 with the mobile device 114 to the marketing system 104 of the marketer associated with the designated geographic region 108. The marketing system 104 can then communicate at 134 the journey 126 to the mobile device 114 of the resort visitor 112, such as a push notification to the mobile device. The journey is designed to elicit a location-based visitor response from the visitor with the mobile device, such as to prompt the visitor to travel from the current starting location to another area of the designated geographic region 108. In this example system 100, a journey 136 is shown displayed on the mobile device 114 as a graphic that is intended to indicate or entice the visitor 112 to visit the restaurant from the pool area. The journey 136 may include a coupon or any other type of discount or reward-based consumer enticement. Although displayed as a graphic or image in this example, a journey can be designed as any type of audio, video, image, or other type of communication to a user of a mobile device.

In an implementation, a journey 126 that has been determined by the journey determination application 124 at the cloud-based service system 102 can be communicated to the mobile device 114 of the visitor 112 in the designated geographic region 108 from a server computing device at the cloud-based service system 102 via a communication network 138. In an alternate implementation, the journey 136 is routed via the marketing system 104 that then communicates the journey to the mobile device 114 of the visitor 112.

Any of the devices, servers, and/or services described herein can communicate via the network 138, such as for data communication between the cloud-based service system 102, the marketing system 104, and/or the mobile device 114. The network 138 can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Figure 2:
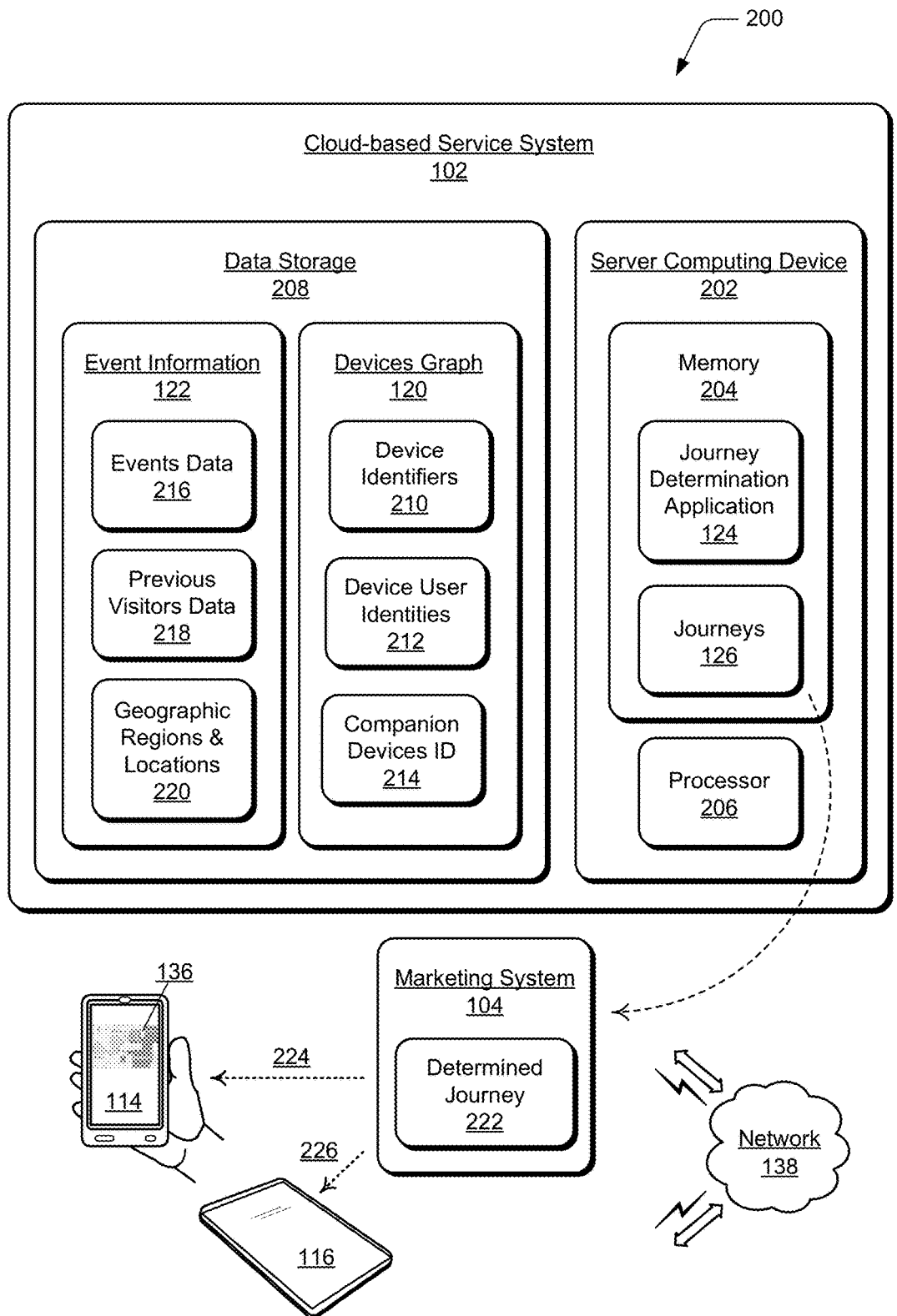
FIG. 2 further illustrates features of the example system in accordance with one or more aspects of a service system to determine journeys based on companion relationship.

FIG. 2 illustrates an implementation example 200 of the cloud-based service system 102 in the example system 100 that is shown and described with reference to FIG. 1, and in which techniques can be implemented for a service system to determine journeys based on companion relationship. The example 200 includes the cloud-based service system 102, the mobile device 114, the companion device 116, and the network 138 via which any of the devices, servers, and/or services described herein can communicate.

The cloud-based service system 102 includes a server computing device 202, which is representative of one or more hardware server devices (e.g., computing devices) that may be implemented at a cloud-based service system. The server computing device 202 includes memory 204 and a processor 206, and may include any number and combination of different components as further described with reference to the example device shown in FIG. 5. For example, the server computing device 202 can include one or more communication systems for communication with the marketing system 104 and/or with the mobile devices via the network 138.

In this example, the server computing device 202 implements the journey determination application 124 as a software application or module, such as executable software instructions (e.g., computer-executable instructions) that are executable with a processing system (e.g., the processor 206) of the server computing device 202 to implement the techniques of a service system to determine journeys based on companion relationship. The journey determination application 124 can be stored on computer-readable storage media, such as any suitable memory device (e.g., the memory 204) or electronic data storage implemented in the server computing device 202 and/or at the cloud-based service system 102. The cloud-based service system 102 may include multiple data storage, server devices, and applications, and can be implemented with various components as further described with reference to the example device shown in FIG. 5.

The cloud-based service system 102 includes data storage 208 that may be implemented as any suitable memory, memory device, or electronic data storage for network-based data storage. The data storage 208 is utilized at the cloud-based service system 102 to maintain the devices graph 120 and the event information 122, as described with reference to the example system shown in FIG. 1. The devices graph 120 includes the device identifiers 210 that are correlated to the device user identities 212. A device identifier 210 is a unique code that is assigned to a particular user device, and in addition to the unique code for the mobile device, may include other information about the user associated with the mobile device.

Further, the devices graph 120 includes the companion devices identifiers 214 that correlate one or more additional mobile devices with an identifier of a particular user of a mobile device, or with the mobile device itself. The journey determination application 124 can determine the correlation of a mobile device with an identity 212 of a user, such as the visitor 112 who is correlated with the mobile device 114 at the resort property 106, as shown and described with reference to FIG. 1. The journey determination application 124 can also determine one or more companion devices from the companion devices identifiers 214 of the devices graph 120, such as the companion device 116 that is associated with the mobile device 114 of the visitor 112 at the resort property 106.

The data storage 208 is also utilized at the cloud-based service system 102 to maintain the event information 122, which includes information to associate events data 216 with previous visitors data 218 (e.g., data related to current and previous visitors) in geographic regions and locations 220. Generally, an event described by the events data 216 can be any action or series of actions that take place at one or more specific locations within the designated geographic area 108.

As noted above, the events data 216 that is associated with the previous visitors within the designated geographic region 108 (e.g., the resort property 106) can include event information, such as for any type of activity and/or transactions for goods or services. The previous visitors data 218 describes visitors at a resort, a hotel, or other travel destination who typically participate in various activities and are inclined to shop, dine, and engage in other vacation-type activities that can be summarized as the event information 122.

The events that are described by the events data 216, and that are associated with the previous visitors by the previous visitors data 218 as the event information 122, can also include the geographic regions and locations 220, such as an initial location of a mobile device that corresponds to a previous visitor and one or more subsequent defined locations of the mobile device within the designated geographic region as a previous visitor travels to the various region locations 220 carrying the mobile device. It should be noted that privacy concerns are avoided because the event information 122 does not include personal identifying information of any of the previous visitors. Rather, the event information 122 can be used to associate the events data 216 about previous events with previous visitors based on non-personal identifying information maintained as the previous visitors data 218.

As described above, the journey determination application 124 can determine a journey 126 based on the starting location of a mobile device 114 in the designated geographic region 108, the relationship of a companion to the user of the mobile device, and based on the events data 216 that are associated with the previous visitors, as described by the previous visitors data 218, within a geographic region and location 220. For example, previous visitors to the resort property 106 may have been likely to visit the lounge and/or the restaurant if the starting location is the pool area in the designated geographic region 108. Further, some previous visitors to the resort property 106 may have been likely to purchase a refreshment after using the gym in the designated geographic region 108. Based on the previous visitors, a journey 126 may be stored or saved as a learned journey that was previously determined and utilized for the previous visitors at the same or similar location. A series of events that are repeated by several previous visitors can be saved as a learned journey, recognizing a trend in visitor events, and a learned journey can be determined for later visitors based on the previous visitors data 218 of the previous visitors.

Similarly, the journey determination application 124 can determine the journey 126 for the current visitor 112 based on the starting location of the mobile device 114 in the designated geographic region 108 and based on the relationship of the companion to the visitor with the mobile device, and the journey is designed to elicit a location-based visitor response from the visitor with the mobile device 114 in the designated geographic region 108. For example, the companion devices identifiers 214 of the devices graph 120 identifies additional mobile devices, such as the companion device 116 that is associated with the mobile device 114 of the visitor 112 at the particular resort property 106 in the designated geographic region 108.

A journey 222 that has been determined by the journey determination application 124 at the cloud-based service system 102 can then be communicated as a suggested, relevant journey to the marketing system 104 of the marketer that is associated with the designated geographic region. The marketing system 104 may then communicate the journey at 224 to the mobile device 114 of the resort visitor 112 and/or can be communicated at 226 to the companion device 116 in the designated geographic region 108. In implementations, the determined journey 222 can be communicated as a push notification to the mobile device 114 of the resort visitor 112 and/or to the companion device 116. Further, as noted above, the determined journey 222 may be routed via the marketing system 104 that then communicates the journey 222 via the network 138 to the mobile device 114 of the visitor 112 and/or to the companion device 116.

In implementations, the mobile device 114 of a visitor and/or the one or more companion devices that are associated with the mobile device or user may be any type of computer, mobile phone, tablet device, communication device, or other computing device. Further, the mobile device 114 and/or the companion device 116 can be implemented with various components, such as a processing system and memory, and with any number and combination of different components as further described with reference to the example device shown in FIG. 5. The mobile device 114 and/or the companion device 116 can also be implemented with an application having a push notification interface, such as to display the journey 136 on the mobile device 114 as an image or other type of graphic. In aspects of the described features, the marketing system 104 and/or a mobile device 114 of a user may also implement some or all of the features of the journey determination application 124 to determine a journey for a visitor at a designated geographic region.

In implementations, the cloud-based service system 102 and/or the marketing system 104 can maintain a record of the information sent and received by the mobile device 114 of the visitor 112 regarding any journeys 126. This information can be maintained and added to the event information 122 to determine and learn subsequent journeys for subsequent visitors. Additionally, the use of this information may increase the accuracy of marketing system predictions of the likelihood that a visitor may engage in the desired response to a specific journey 126. For example, if the marketing system 104 does not have much data for a defined location 110 within the designated geographic region 108 at the time the visitor 112 enters the designated geographic region 108, then the marketing system 104 may be unable to predict the likelihood that the visitor would engage in a desired action based on a journey. For example, a new pool area may have been recently added to the to the resort property 106, and the marketing system 104 may be unaware of the tendencies of the visitors who use the new pool, in which case, the marketing system may not be able to use a journey 126 with a high likelihood of successfully eliciting a desired response from a visitor. However, as more visitors use the new pool area, more data is communicated and maintained by the cloud-based service system 102 and/or by the marketing system 104, allowing the marketing system 104 to begin using the journeys 126 with higher likelihoods of eliciting a desired response from subsequent visitors.

Example methods 300 and 400 are described with reference to respective FIGS. 3 and 4 in accordance with one or more aspects of a service system to determine journeys based on companion relationship. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
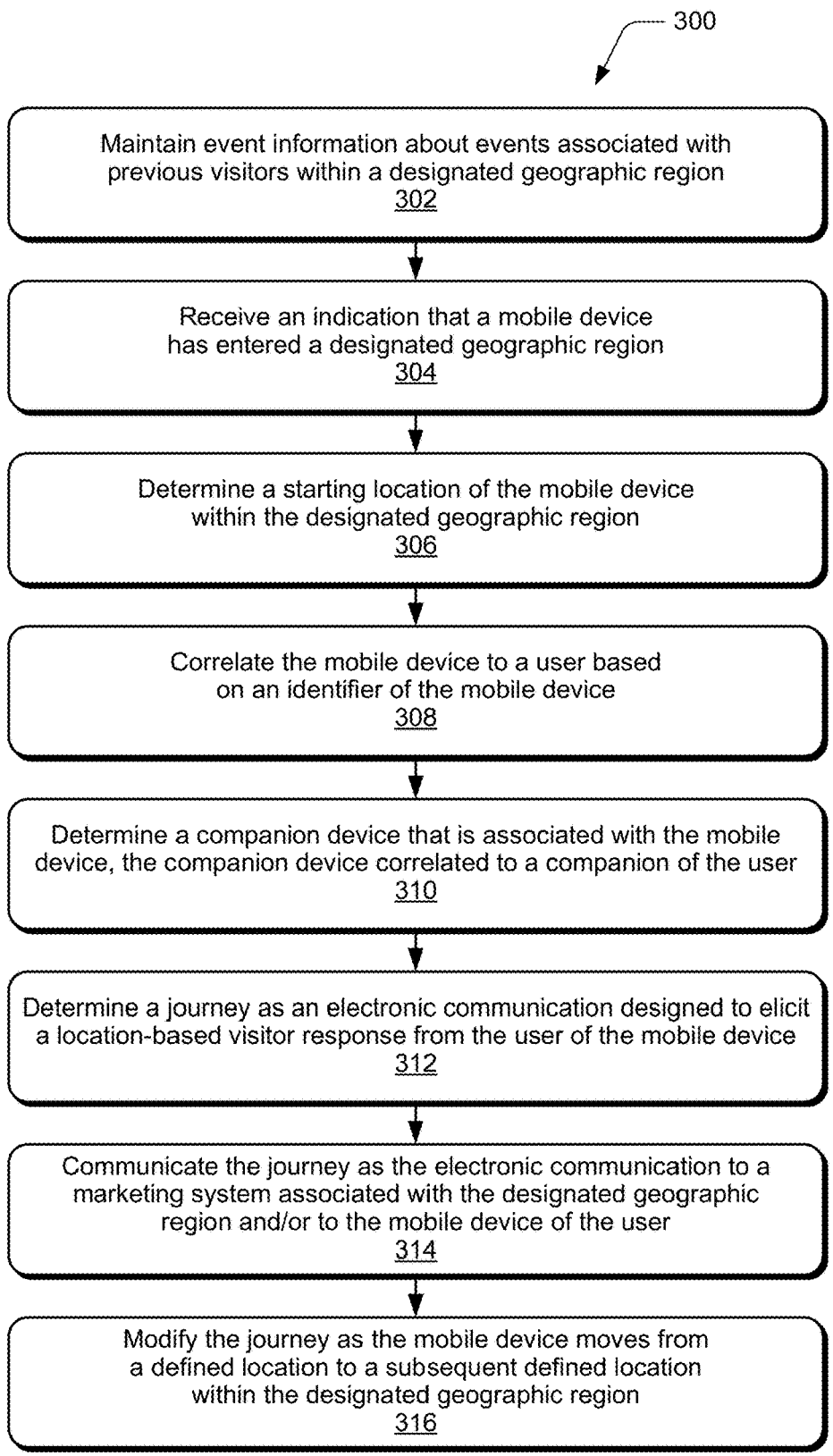
FIG. 3 illustrates an example method of a service system to determine journeys based on companion relationship in accordance with one or more implementations.

FIG. 3 illustrates example method(s) 300 for a service system to determine journeys based on companion relationship, and is generally described with reference to the journey determination application that is shown and described with reference to FIGS. 1 and 2. The order in which the method is described is not intended to be construed as a limitation, and any number or combination of the method operations can be combined in any order to implement a method, or an alternate method.

At 302, event information is maintained about events associated with previous visitors within a designated geographic region. For example, the cloud-based service system 102 includes the data storage 208 to maintain (e.g., store and update) the event information 122 about events that are described by the events data 216, the previous visitors that are described by the previous visitors data 218, and the geographic regions and locations 220. The events data 216 that is associated with previous visitors within the designated geographic region 108, as described by the previous visitors data 218, can include event information and location information, such as maintained and/or received from the marketing system 104 associated with the designated geographic region 108. An event that is described by the events data 216 and associated with a previous visitor includes at least an initial location of a mobile device corresponding to the previous visitor and one or more subsequent defined locations 220 of the mobile device within the designated geographic region. Further, an event that is described by the events data 216 and is associated with a previous visitor can include transactional history associated with the previous user within a defined location 220 of the designated geographic region 108.

At 304, an indication is received that a mobile device has entered a designated geographic region. For example, the journey determination application 124 that is implemented by the server computing device 202 of the cloud-based service system 102 receives an indication that the mobile device 114 has entered a designated geographic region 108. The journey determination application 124 can receive the indication that the mobile device 114 has entered the designated geographic region 108 from the marketing system 104, from any of the connected devices 118 in the designated geographic region 108, or from the mobile device 114 itself. In implementations, the marketing system 104 receives indications of where devices are located in the designated geographic region 108, such as from the connected devices 118 that ping or otherwise communicate with the mobile devices of visitors to the resort property 106. The marketing system 104 can then communicate the device and region information to the cloud-based service system 102. The connected devices 118 can communicate locations of the mobile devices within the designated geographic region 108 to the marketing system 104 and/or to the cloud-based service system 102 as the mobile devices move about the resort property.

At 306, a starting location of the mobile device within the designated geographic region is determined. For example, the journey determination application 124 that is implemented by the server computing device 202 receives an indication of the starting location of the mobile device 114 within the designated geographic region 108. In implementations, the marketing system 104 can communicate a device identifier 210 of the mobile device 114 to the cloud-based service system 102, as well as the starting location of the mobile device 114, such as at the pool area in the designated geographic region 108 of the resort property 106. The journey determination application 124 may also receive an indication of the starting location of the mobile device 114 within the designated geographic region 108 from the marketing system 104, from any of the connected devices 118 in the designated geographic region 108, or from the mobile device 114 itself.

At 308, the mobile device is correlated to an identifier of a user based on an identifier of the mobile device. For example, the journey determination application 124 that is implemented by the server computing device 202 correlates the mobile device 114 with the visitor 112 based on the device identifier 210 of the mobile device from the devices graph 120 that correlates to a device user identity of a user who is associated with one or more devices based on an identifier of each respective device.

At 310, a companion device that is associated with the mobile device is determined, the companion device being correlated to a companion of the user of the mobile device. For example, the journey determination application 124 that is implemented by the server computing device 202 determines that the companion device 116 is associated with the mobile device 114 based on companionship information in the devices graph 120 identifying the association of the companion device 116 to the mobile device 114. The companion device 116 is correlated to an identity of the companion of the user of the mobile device, such as a family member or business associate, and the companionship information can include identifying the relationship of the companion to the user.

At 312, a journey is determined as an electronic communication designed to elicit a location-based visitor response from the user of the mobile device. For example, the journey determination application 126 that is implemented by the server computing device 202 determines the journey 126 based on the starting location of the mobile device 114 in the designated geographic region 108, the relationship of the companion to the user of the mobile device, and based on the events data 216 that is associated with previous visitors within the designated geographic region, as described by the previous visitors data 218. The determined journey 222 is designed to elicit a location-based visitor response from the user of the mobile device (e.g., the visitor 112 who has the mobile device 114 located at the pool area in the designated geographic region 108). The journey 126 is also determined based on companionship information corresponding to the mobile device 114, such as the companion devices identifier 214 of the companion device 116 that is associated with the mobile device 114, and which is also located within the designated geographic region 108 indicating at least one companion of the visitor, such as a family member or business associate who also has the companion device and travels with the visitor.

At 314, the journey is communicated as the electronic communication to a marketing system associated with the designated geographic region and/or to the mobile device of the user. For example, the server computing device 202 (or other communication-enabled device at the cloud-based service system 102) communicates the journey 222 as a suggested, relevant journey to the marketing system 104 of the marketer that is associated with the designated geographic region. The marketing system 104 may then communicate the journey to the mobile device 114 of the resort visitor 112 and/or the journey can be communicated to the companion device 116 in the designated geographic region 108. In implementations, the journey 222 is communicated to the mobile device 114 and/or to the companion device 116 via routing through the marketing system 104 of the marketer that seeks to elicit the location-based visitor response from the user.

At 316, the journey is modified as the mobile device moves from a defined location to a subsequent defined location within the designated geographic region. For example, the journey determination application 124 that is implemented by the server computing device 202 modifies (or determines or generates a new journey 126 as the method continues at 306), and the modified journey is designed to elicit an alternate location-based visitor response from the user. In an example, a journey 126 may be updated based on the movement of the mobile device 114 (e.g., along with the visitor 112) through the designated geographic region 108 and other visitor events. The journey 222 may be sent to the marketing system 104 and/or to the mobile device 114 located within the designated geographic region 108 of the resort property 106 informing the visitor of the location of the juice bar after a workout session in the gym. However, if the visitor bypasses the juice bar following the mobile device 114 receiving the journey 222, then the journey may be updated or modified to include an alternative journey to, for example, the spa with an advertisement or coupon for a massage.

Figure 4:
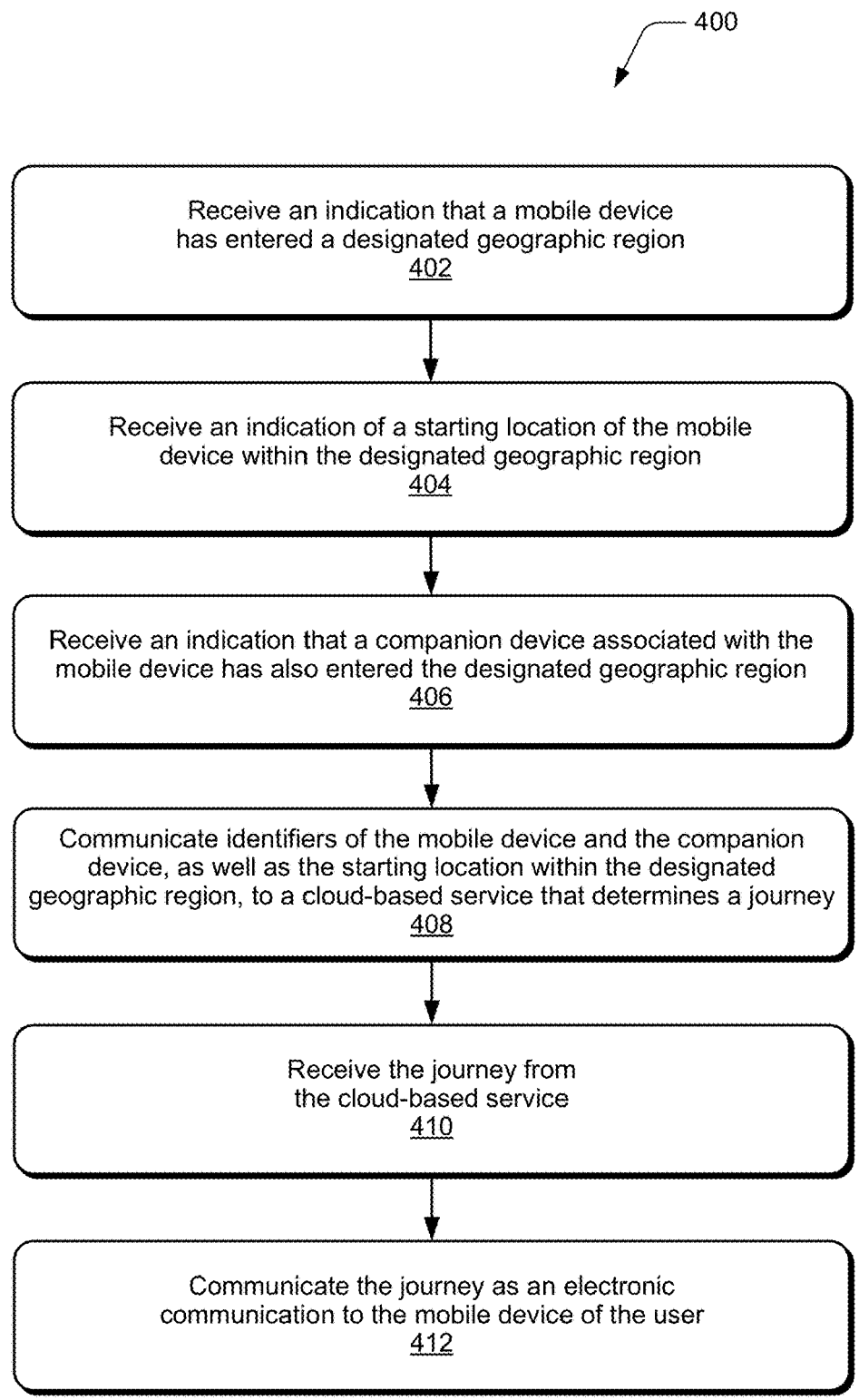
FIG. 4 illustrates an example method of a service system to determine journeys based on companion relationship in accordance with one or more implementations.

FIG. 4 illustrates example method(s) 400 for a service system to determine journeys based on companion relationship, and is generally described with reference to a marketer that seeks to have a journey determined for a visitor in a designated geographic region as shown and described with reference to FIGS. 1 and 2. The order in which the method is described is not intended to be construed as a limitation, and any number or combination of the method operations can be combined in any order to implement a method, or an alternate method.

At 402, the marketing system receives an indication that a mobile device has entered a designated geographic region. For example, the marketing system 104 receives an indication from the connected devices 118 on the resort property 106 that the mobile device 114 of the visitor 112 has entered the designated geographic region 108 of the resort property, such as when the visitor and one or more companions arrive at the resort property 106 for a vacation and/or for business purposes. The marketing system 104 can receive the indication that the mobile device 114 has entered the designated geographic region 108 from the connected devices 118, or from the mobile device 114 itself.

At 404, the marketing system receives an indication of a starting location of the mobile device within the designated geographic region. For example, the marketing system 104 receives an indication of the starting location of the mobile device from the connected devices 118 on the resort property 106, such as an indication that the mobile device 114 of the visitor 112 is located in the pool area of the resort property 106 within the designated geographic region 108. The marketing system 104 can receive the indication of the starting location of the mobile device 114 within the designated geographic region 108 from the connected devices 118, or from the mobile device 114 itself.

At 406, receive an indication that a companion device associated with the mobile device has also entered the designated geographic region. For example, the marketing system 104 receives an indication from the connected devices 118 on the resort property 106 that the companion device 116, which is associated with the mobile device 114, has also entered the designated geographic region 108 of the resort property, such as when the visitor and a companion arrive at the resort property 106 for a vacation and/or for business purposes. The marketing system 104 can receive the indication that the companion 116 has entered the designated geographic region 108 from the connected devices 118, or from the companion device 116 itself.

At 408, the marketing system communicates identifiers of the mobile device and companion devices, as well as the starting location of the devices within the designated geographic region to a cloud-based service system that determines a journey. For example, the marketing system 104 communicates a device identifier 210 of the mobile device 114 and a companion device identifier 214 to the cloud-based service system 102, as well as the starting location of the devices, such as at the pool area in the designated geographic region 108 of the resort property 106. The journey determination application 126 that is implemented by the server computing device 202 then determines the journey 126 based on the starting location of the mobile device 114 in the designated geographic region 108, the relationship of the companion to the user of the mobile device, and based on the events data 216 that is associated with previous visitors within the designated geographic region, as described by the previous visitors data 218.

At 410, the marketing system receives the journey from the cloud-based service system and, at 412, communicates the journey to the mobile device of the user. The marketing system 104 receives the journey 222 from the cloud-based service system 102, as determined by the journey determination application 124 implemented by the server computing device 202, and communicates the journey 222 as an electronic communication to the mobile device 114 of the resort visitor 112 and/or to the companion device 116 in the designated geographic region 108.

Figure 5:
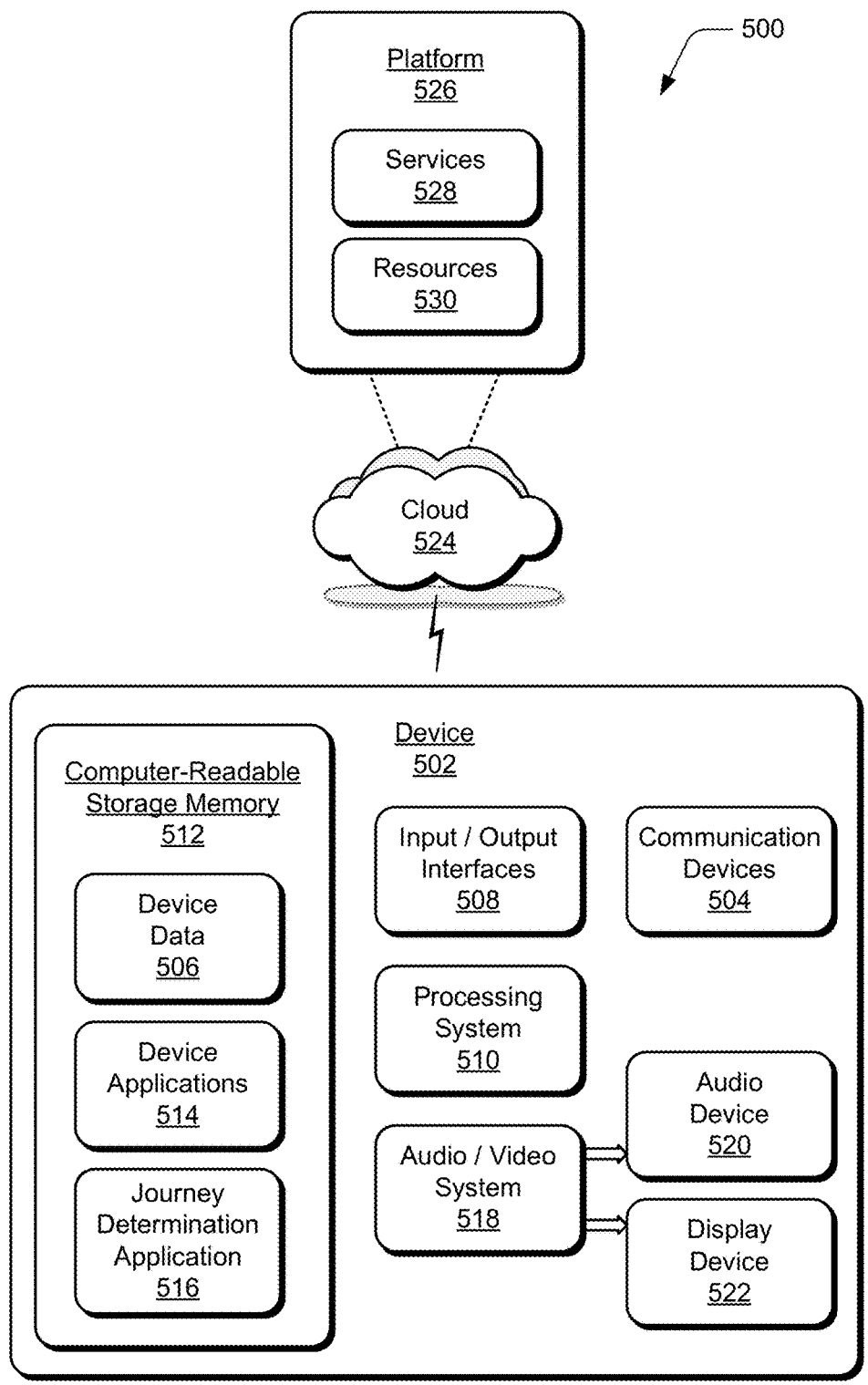
FIG. 5 illustrates an example system with an example device that can implement aspects of a service system to determine journeys based on companion relationship.

FIG. 5 illustrates an example system 500 that includes an example device 502, which can implement techniques of a service system to determine journeys based on companion relationship. The example device 502 can be implemented as any of the computing devices, mobile devices, server devices, and/or services described with reference to the previous FIGS. 1-4, such as any type of computing device, client device, mobile phone, tablet, communication, entertainment, gaming, media playback, and/or other type of device. For example, the mobile device 114, the server computing device 202, and/or various server devices of the cloud-based service system 102 and the marketing system 104 may be implemented as the example device 502.

The example device 502 includes communication devices 504 that enable wired and/or wireless communication of device data 506, such as data that is communicated between the devices in a network, event information, updated event information, journey information and determined journeys, and computer applications data and content that is transferred from one computing device to another, and/or synched between multiple computing devices. The device data can include any type of audio, video, image, and/or graphic data that is generated by applications executing on the device. The communication devices 504 can also include transceivers for cellular phone communication and/or for network data communication.

The device 502 also includes input/output (I/O) interfaces 508, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 502. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The example device 502 also includes computer-readable storage memory 512, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 512 provides storage of the device data 506 and various device applications 514, such as an operating system that is maintained as a software application with the computer-readable storage memory and executed by the processing system 510. In this example, the device applications also include various computer applications and a journey determination application 516 that implements the described techniques of a service system to determine journeys based on companion relationship, such as when the example device 502 is implemented as the server computing device 202 shown in FIG. 2. An example of the journey determination application 516 includes the journey determination application 124 that is implemented by the server computing device 202, and/or various server devices of the cloud-based service system 102 and the marketing system 104, as described with reference to FIGS. 1-4.

The device 502 also includes an audio and/or video system 518 that generates audio data for an audio device 520 and/or generates display data for a display device 522. The audio device and/or the display device include any devices that process, display, and/or otherwise render audio, video, display, and/or image data, such as any form of a journey. In implementations, the audio device and/or the display device are integrated components of the example device 502. Alternatively, the audio device and/or the display device are external, peripheral components to the example device. In embodiments, at least part of the techniques described for synchronizing linked assets from unsynchronized file folders may be implemented in a distributed system, such as over a "cloud" 524 in a platform 526. The cloud 524 includes and/or is representative of the platform 526 for services 528 and/or resources 530. For example, the services 528 may include the cloud-based service system 102 described with reference to FIGS. 1-4.

The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud 524.

Although implementations of a service system to determine journeys based on companion relationship have been described in language specific to features and/or methods, the appended claims are not necessarily limited to the specific features or methods described. Rather, the specific features and methods are disclosed as example implementations of a service system to determine journeys based on companion relationship, and other equivalent features and methods are intended to be within the scope of the appended claims. Further, various different examples are described and it is to be appreciated that each described example can be implemented independently or in connection with one or more other described examples.

The invention claimed is:

1. In a digital medium environment to determine a journey for a marketing system based on companion relationship, a method implemented by at least one computing device of a service system, the method comprising:

receiving an indication that a mobile device has entered a designated geographic region, the mobile device being correlated to an identity of a user based on an identifier of the mobile device;

determining a companion device that is associated with the mobile device based on companionship information identifying the association of the companion device to the mobile device, the companion device being correlated to a companion of the user, and the companionship information further identifying a relationship of the companion to the user; and determining the journey as an electronic communication designed to elicit a location-based visitor response from the user of the mobile device, the journey being determined based on at least the relationship of the companion to the user of the mobile device and events associated with previous visitors within the designated geographic region, the journey emphasizing a first region location over a second region location within the designated geographic region based on the relationship of the companion to the user of the mobile device.

2. The method as recited in claim 1, further comprising: communicating the journey as a suggested, relevant journey for the user of the mobile device to a marketing system associated with the designated geographic region.

3. The method as recited in claim 2, wherein the journey is communicated as the electronic communication to the mobile device of the user from the marketing system of a marketer that seeks to elicit the location-based visitor response from the user.

4. The method as recited in claim 1, wherein the companionship information identifies the relationship of the companion to the user as one of a family member or a business associate.

5. The method as recited in claim 4, wherein the journey that is being determined based on the relationship of the companion to the user includes one of the journey being determined as a family journey if the relationship of the companion is the family member of the user, or the journey being determined as a business journey if the relationship of the companion is the business associate.

6. The method as recited in claim 1, wherein the journey is based on the events associated with the previous visitors within at least one defined location of the designated geographic region, and based on a starting location of the mobile device within the designated geographic region.

7. The method as recited in claim 1, wherein the events associated with the previous visitors within the designated geographic region includes event information and location information maintained by a marketing system associated with the designated geographic region.

8. The method as recited in claim 1, wherein an event associated with a previous visitor includes at least an initial location of a user device corresponding to the previous visitor and one or more subsequent defined locations of the user device within the designated geographic region.

9. The method as recited in claim 1, wherein an event associated with a previous visitor includes transactional history associated with an identity of the previous user within at least one defined location of the designated geographic region.

10. The method as recited in claim 1, further comprising: modifying the journey as the mobile device moves from a defined location to a subsequent defined location within the designated geographic region, the modified journey designed to elicit an alternate location-based visitor response from the user.

11. A server computing device implemented to determine a journey for a marketing system, the server computing device comprising:
a memory to maintain event information about events associated with previous visitors within a designated geographic region, the memory maintaining a devices graph that correlates respective identities of users with one or more devices based on an identifier of each respective device;
a processor system configured to execute a journey determination application implemented to perform operations comprising to:
receive an indication that a mobile device has entered the designated geographic region and is located at a starting location within the designated geographic region;
correlate the mobile device to an identity of a user based on the devices graph;
determine a companion device that is associated with the mobile device based on companionship information identifying the association of the companion device to the mobile device, the companion device being correlated to a companion of the user, and the companionship information further identifying a relationship of the companion to the user; and
determine the journey as an electronic communication designed to elicit a location-based visitor response from the user of the mobile device, the journey being determined based on at least the relationship of the companion to the user of the mobile device, the starting location of the mobile device, and the events associated with the previous visitors within the designated geographic region, the journey emphasizing a first region location over a second region location within the designated geographic region based on the relationship of the companion to the user of the mobile device.

12. The server computing device as recited in claim 11, wherein the journey determination application is implemented to initiate communication of the journey as a suggested, relevant journey for the user of the mobile device to a marketing system associated with the designated geographic region.

13. The server computing device as recited in claim 12, wherein the journey is communicated as the electronic communication to the mobile device of the user from the marketing system of a marketer that seeks to elicit the location-based visitor response from the user.

14. The server computing device as recited in claim 11, wherein the companionship information identifies the relationship of the companion to the user as one of a family member or a business associate.

15. The server computing device as recited in claim 14, wherein the journey determination application is implemented to determine the journey based on the relationship of the companion to the user, the journey being determined as a family journey if the relationship of the companion is the family member of the user, or the journey being determined as a business journey if the relationship of the companion is the business associate.

16. The server computing device as recited in claim 11, wherein the journey determination application is implemented to determine the journey based on the event information about the events associated with the previous visitors within at least one defined location of the designated geographic region.

17. The server computing device as recited in claim 11, wherein an event associated with a previous visitor includes at least an initial location of a user device corresponding to the previous visitor and one or more subsequent defined locations of the user device within the designated geographic region.

18. The server computing device as recited in claim 11, wherein an event associated with a previous visitor includes transactional history associated with an identity of the previous visitor within at least one defined location of the designated geographic region.

19. The server computing device as recited in claim 11, wherein the journey determination application is implemented to modify the journey as the mobile device moves from a defined location to a subsequent defined location within the designated geographic region, the modified journey designed to elicit an alternate location-based visitor response from the user.

20. A system for determining a journey for a marketing system, the system comprising:

a memory for storing event information about events associated with previous visitors within a designated geographic region, the memory further storing a devices graph that correlates respective identities of users with one or more devices based on an identifier of each respective device;

means for correlating a mobile device to an identity of a user based on the devices graph and an indication that the mobile device has entered the designated geographic region and is located at a starting location within the designated geographic region;

means for determining a companion device that is associated with the mobile device based on companionship information identifying the association of the companion device to the mobile device, the companion device being correlated to a companion of the user, and the companionship information further identifying a relationship of the companion to the user; and means for determining the journey as an electronic communication to the mobile device, the journey designed to elicit a location-based visitor response from the user of the mobile device, and the journey being determined based on at least the relationship of the companion to the user of the mobile device, the starting location of the mobile device, and the events associated with the previous visitors within the designated geographic region, the journey emphasizing a first region location over a second region location within the designated geographic region based on the relationship of the companion to the user of the mobile device.

* * * * *